US010880207B2

(12) United States Patent
Mukherjee et al.

(10) Patent No.: US 10,880,207 B2
(45) Date of Patent: Dec. 29, 2020

(54) METHODS AND SYSTEMS FOR FLOW VIRTUALIZATION AND VISIBILITY

(71) Applicant: Cumulus Networks Inc., Mountain View, CA (US)

(72) Inventors: Shrijeet Mukherjee, San Carlos, CA (US); Sameer Merchant, Sunnyvale, CA (US); Wilson Kok, San Jose, CA (US); Roopa Prabhu, San Jose, CA (US)

(73) Assignee: Cumulus Networks Inc., Mountain View, CA (US)

( * ) Notice: Subject to any disclaimer, the term of this patent is extended or adjusted under 35 U.S.C. 154(b) by 0 days.

(21) Appl. No.: 15/823,925

(22) Filed: Nov. 28, 2017

(65) Prior Publication Data
US 2019/0166044 A1    May 30, 2019

(51) Int. Cl.
*H04L 12/721*    (2013.01)
*H04L 12/723*    (2013.01)
*H04L 29/06*    (2006.01)
*H04L 12/741*    (2013.01)
*H04L 29/12*    (2006.01)

(52) U.S. Cl.
CPC ............. *H04L 45/50* (2013.01); *H04L 45/38* (2013.01); *H04L 45/54* (2013.01); *H04L 63/08* (2013.01); *H04L 61/6004* (2013.01); *H04L 61/6059* (2013.01); *H04L 63/0428* (2013.01)

(58) Field of Classification Search
None
See application file for complete search history.

(56) References Cited

U.S. PATENT DOCUMENTS

| | | | | | |
|---|---|---|---|---|---|
| 7,467,227 | B1 * | 12/2008 | Nguyen | .............. | H04L 12/2856 709/238 |
| 7,526,571 | B1 * | 4/2009 | Tappan | .............. | H04L 29/12358 370/230 |
| 2006/0130126 | A1 * | 6/2006 | Touve | ................. | H04L 63/0815 726/5 |
| 2007/0206621 | A1 * | 9/2007 | Plamondon | ........... | H04L 1/1887 370/413 |
| 2017/0264600 | A1 * | 9/2017 | Froelicher | ........... | H04L 61/6004 |

OTHER PUBLICATIONS

Cisco Systems, Inc., "Implementing IPv6 over MPLS," IPv6 Implementation Guide, Cisco IOS Release 15.2M&T (2012), 17 pages.
(Continued)

*Primary Examiner* — Nicholas Sloms
(74) *Attorney, Agent, or Firm* — Ascenda Law Group, PC

(57) ABSTRACT

Identity information is decoupled from reachability information in packets transferred between hosts of a computer network by replacing forwarding information within said packets with an identifier having a format of the forwarding information, and applying forwarding labels, derived from the identifiers, which are then used in lieu of the forwarding information for conveying the packets within the network. During such conveyance, the packets are treated according to one or more policies prescribed on a basis of the identifier, which may be an IPv6 address. The forwarding labels may be MPLS labels.

7 Claims, 3 Drawing Sheets

(56) References Cited

OTHER PUBLICATIONS

Cisco Systems, Inc., "Multiprotocol Label Switching Overview," Cisco IOS Switching Services Configuration Guide Release 12.2 (2014), 61 pages.
Fayazbakhsh, Seyed Kaveh et al., "Enforcing Network-Wide Policies in the Presence of Dynamic Middlebox Actions Using FlowTags," NSDI '14: 11th USENIX Symposium on Networked Systems Design and Implementation (Apr. 2-4, 2014) Seattle, WA, 14 pages.

* cited by examiner

METHODS AND SYSTEMS FOR FLOW VIRTUALIZATION AND VISIBILITY

FIELD OF THE INVENTION

The present invention is directed to systems and methods for flow virtualization and visibility, and in particular, to such methods and systems as employ means for decoupling application and/or host/interface identity information from reachability information in networking protocols.

BACKGROUND

Modern computer networks, and networks of networks, include three main components: computing platforms (endpoints), data (usually organized in the form of packets) conveyance infrastructures, and services (applications). In a typical connection path, an endpoint known as a client connects to a server-based service via a myriad of applications that make up a data conveyance infrastructure. So that these components can interact with one another, agreed identification and reachability information (addresses) must be used by nodes in the execution path to ensure that data arrives at its intended destination. Internet protocol (IP) addresses are among the most prevalent form of such identifiers and addresses used today.

The dual role of IP addresses, as identifiers of endpoints (in the form of computing platform interfaces) and reachability information used by data conveyance infrastructures to make routing decisions, etc., while convenient, can lead to a loss of visibility and/or added complexity when one seeks to investigate and/or manage how the data is treated at points along an execution path. IP addresses typically have no long-term persistence. Instead, it is often the case that every time a computing platform interface connects to a network, it is assigned a new IP address. Thus, applying flow-specific policies to data becomes a complex task and often requires the use of dedicated appliances. This means that execution paths are made even more complex as additional network hops are required to accommodate the policy-enforcement nodes. Moreover, applying flow-based policies requires relying on more than just IP addresses. Indeed, not every packet may be expected to include sufficient information for application of such policies (e.g., as a result of fragmentation, etc.). This makes flow-based security enforcement fragile and compute intensive.

SUMMARY

In one embodiment, the present invention provides a method for flow virtualization and visibility, and in particular, a method for decoupling host/interface identity information from reachability information in networking protocols in which one or more packets originated by a first host and destined for a second host are intercepted, forwarding information within said packets is replaced with an identifier having a format of the forwarding information; and forwarding labels are applied to the packets, said forwarding labels being derived from the identifiers. The packets are conveyed within a network according to the forwarding labels but not the identifier; and at one or more nodes of the network, the packets are treated according to one or more policies prescribed on a basis of the identifier. As more fully discussed below, in one embodiment of the invention the identifier has a format of an Internet protocol version 6 (IPv6) address, and the forwarding labels are multiprotocol label switching (MPLS) labels.

In one example of the above method, after interception the packets are provided to a policy engine remote from a computer-based platform at which the packets were intercepted, and the forwarding information is prescribed by the policy engine. The policy engine also distributes to the one or more nodes of the network, instructions for treating the packets according to the policies. Those instructions include references to the forwarding labels, and the policy engine maintains an association between the forwarding labels and the identifier. Preferably, the identifier includes information sufficient for an intended recipient of the packets to identify whether or not the packets were corrupted during conveyance of the packets to the intended recipient.

These and further embodiments of the invention are discussed in greater detail below.

BRIEF DESCRIPTION OF THE DRAWINGS

The present invention is illustrated by way of example, and not limitation, in the figures of the accompanying drawings, in which.

DETAILED DESCRIPTION

Embodiments of the present invention provide flow virtualization and visibility within computer networks by decoupling or disaggregating endpoint reachability information from identity information through the use of tags or cookies applied on a packet-by-packet basis. Flows, as used herein, are sequences of packets between endpoints. Cookies, as used in this context, are information items that can be used to associate packets with a flow, e.g., for policy enforcement or other purposes, at nodes of a data conveyance infrastructure. In accordance with particular embodiments of the present invention, these cookies are in the form of IPv6 addresses which are used not for routing decisions, but instead are used for packet identification (and decisions based on those identifications) at the nodes of the data conveyance infrastructure. Separate reachability information is used to permit hop-to-hop flow conveyances. By separating identity information from location reachability information within a packet in this fashion, the present invention provides the ability for an administrator and/or an automated system to gain full visibility into each connection running within a defined network (e.g., a data center) without interfering with common and standards-based interfaces used and/or advertised by services within that network. This visibility leads to other abilities, such as flow-based access control, policy enforcement, and performance monitoring and assessment, among others.

Figure 1A:
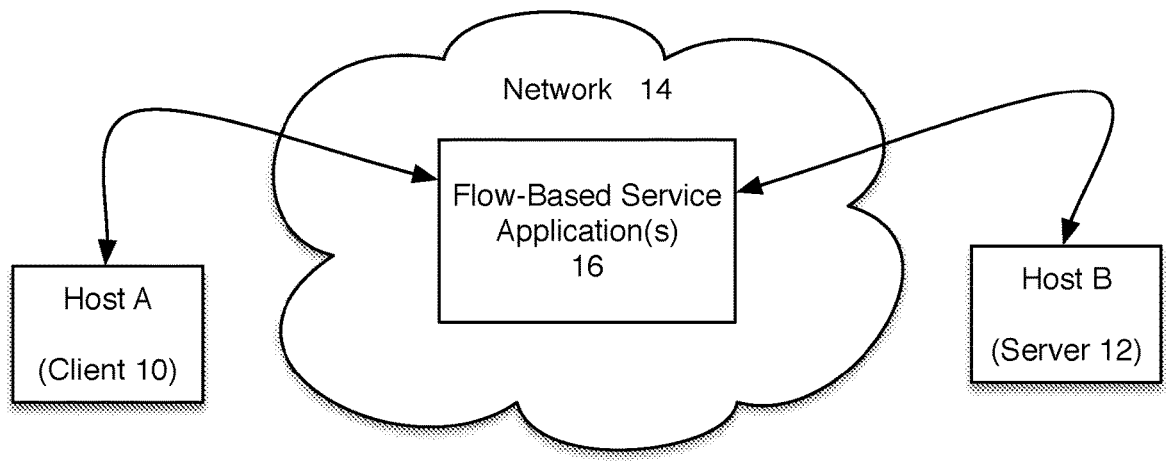
FIG. 1A illustrates a simplified example of a computer network in which embodiments of the present invention find application.

Aspects of the present invention are now described with reference to an example illustrated in FIGS. 1A-1B. In FIG. 1A, an arrangement 10 includes a host A (acting as a client 10 in this example) that accesses a service offered by a host B (acting as a server 12). The connection is via one or more networks 14, which include one or more applications 16 that provide flow based services such as load balancing, firewalling, etc. Although shown as a single instance for purposes of this explanation, flow-based applications 16 may include many applications executing on one or more computing platforms, each responsible for providing a different flow-based service. Moreover, although only a single server 12 is shown, in fact this may represent a server bank fronted by one or more load balancers (which may form part of the flow-based applications), where the server bank includes front-end web servers, application servers, and associated storage, including but not limited to storage networks. Thus, the complete execution path for the host A-host B communications may be very complex, consisting of multiple hops both within and outside of network 14.

Managing such a complex system, e.g., through configuration of flow-based service applications 16 and servers 12, can be a significant challenge. Often, administrators will seek to realize such management through the application of policies—that is, rules for handling certain types of communications between clients and services. However, enforcing those policies typically requires the use of separate enforcement points, as the service applications and other network elements may not maintain state information for the host A-host B communications. Adding such additional policy enforcement points only adds to the complexity of the overall execution path.

To address this situation, the present invention modifies the host A-host B path, by providing, in effect, mapped transformations at each of the endpoints. This is illustrated in FIG. 1B. Now, rather than having the communication path between host A and host B, a new communication path between a virtual host A' and a virtual host B' is established. At each endpoint, A and B, mappings are defined so that the A-to-A' and B-to-B' transformations are understood. These mappings are established by a policy engine 18, which may be hosted on an appliance running in network 14. This may be an existing one or more of the appliances hosting flow-based services applications 16, and/or one or more dedicated appliances. In addition to establishing the A-to-A' and B-to-B' mappings, the policy engine 18 is responsible for informing the flow-based services and other network nodes of the transformations so that these services and nodes operate in accordance with the desired policies for the respective flows between hosts A and B.

Figure 1B:
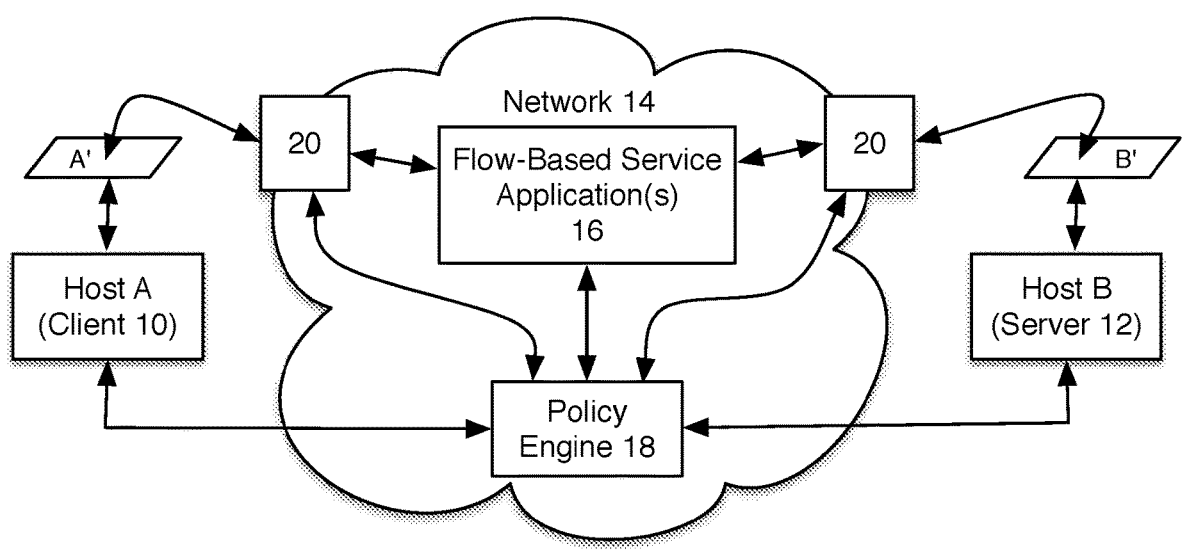
FIG. 1B illustrates the effect of embodiments of the present invention within the simplified example of a computer network as represented by transformations that decouple identity information from reachability information at hosts communicating with one another.

Also shown in FIG. 1B are network ingress and egress nodes 20. These may be, for example, routers. The policy engine 18 is communicatively coupled to the ingress and egress nodes 20 and, as further discussed below, provides information to these ingress and egress nodes concerning the traffic flows between virtual hosts A' and B'. This allows the ingress and egress nodes to apply policies, such as network access policies, on a per-flow basis, and also to ensure that packets associated with respective flows are passed on to the next appropriate hop either within or outside of network 14.

In one embodiment of the present invention, the transformations applied at hosts A and B involve modifications to the A-B communications at the packet level. As noted above, the use of IP addresses is ubiquitous in modern computer networks. Stated differently, most modern computer networks rely on the Internet protocol ("IP") as a network layer communication protocol. IP is a packet-based communication protocol; hence, the A-B communications are comprised of individual packets that each include control information (in the form of a header) and application information or data (in the form of a payload). When a client application 10 running on host A has a message to send to the service 12 running on host B, the client passes the message (i.e., the data comprising the message) to a portion of an operating system or other application at host A that is responsible for subdividing the message into packets. In the case of IP packets, this is a two-step process in which the message is first subdivided into transport layer segments, usually transmission control protocol ("TCP") segments, and the TCP segments are then encapsulated in IP packets as payloads. At host B, the original message is reassembled from the TCP segment payloads of the IP packets. The header information of each packet includes information such as the source and destination addresses of the packet, information useful in determining whether the packet contents were corrupted during transport between A and B, and other items. When the service 12 running on host B has a message to send to the client 10 running on host A, a similar process is employed.

In the subject embodiment of the present invention, the packets used in passing the messages between A and B are modified from their usual form. In particular, the packets are tagged with a cookie that can be used to associate the packets with a flow, e.g., for policy enforcement or other purposes. The cookies are in the form of IPv6 addresses which are then used as source addresses in the headers of the IP packets created at the sending host.

IPv6 (Internet protocol version 6) is the current version of the Internet protocol (at the time of this writing) used in computer networks. It differs, in one respect, from the immediately preceding version, IPv4, by having an increased address space for source and destination addresses: 128 bits vs. 32 bits. IPv6 addresses are numerical labels that specify network interfaces of a host or other network node participating in a computer network; that is, they prescribe information sufficient to permit the routing of packets between hosts. In the usual case, IP addresses of both the source and destination of a packet are present in fields of a packet header when a packet is sent. In embodiments of the present invention, the source address is manipulated to specify one of the transforms, A to A' or B to B', depending on the transmitting node, discussed above.

Figure 2:
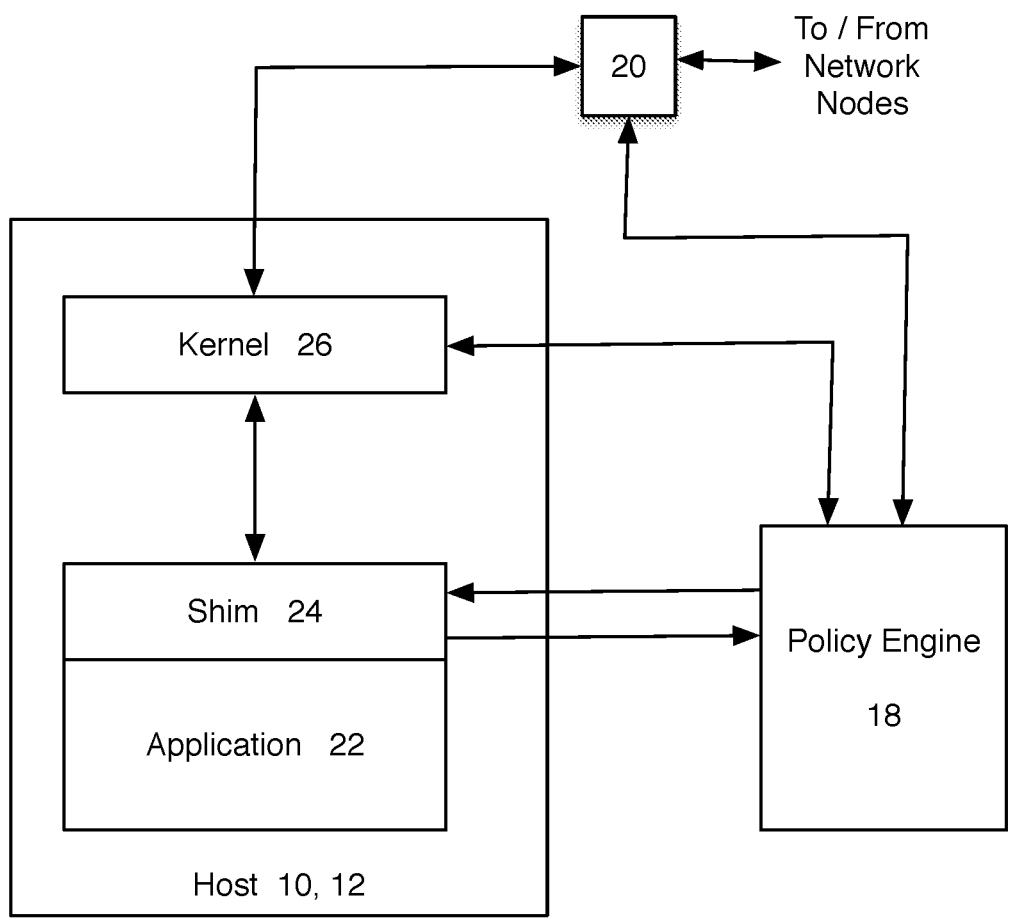
FIG. 2 illustrates an example of a policy engine participating in a process for decoupling identity information from reachability information at a host of the kind illustrated in FIGS. 1A and 1B.

FIG. 2 shows one example of how this manipulation of a source address is implemented. At a transmitting host 10, 12, on which an application 22 is running (in the case of host A, above, this may be a client application, whereas in the case of host B it may be a service), a shim 24 is introduced. A shim, in this context, is a small library or program used to intercept calls made by application 22, and change the arguments that are passed between programs, or portions of programs, and/or to redirect operations intended for the called application or handle those operations itself. In this instance, shim 24 intercepts requests for connections between application 22 (the client) and the service running on host B. The intercepted communications are referred to policy engine 18 (or an associated node), and the policy engine returns the cookie, in the form of an IPv6 address, to be added to packets associated with the intercepted communication. Shim 24 then ensures that all packets of the associated communication (i.e., the associated flow) use this cookie as an IPv6 source address.

Figure 3:
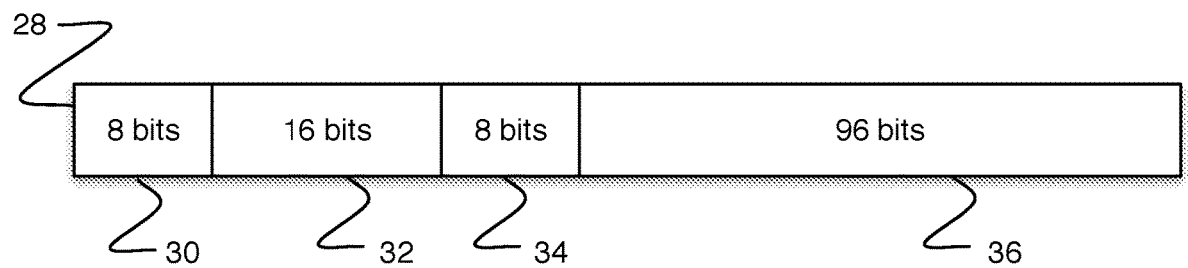
FIG. 3 illustrates an example of an identifier configured in accordance with embodiments of the preset invention.

An example of the IPv6 address form of the cookie used in accordance with the present invention is shown in FIG. 3. Cookie 28 includes an 8-bit identifier field 30, a 16-bit prefix field 32, an 8-bit interface ID field 34, and a hash value field

36. Hash value field 36 is used to store a value that can be used to authenticate the associated packet by a receiving node, as discussed below. Identifier field 30 corresponds to fd00::/7 and identifies the packet as a unique local IPv6 address. The use of such a prefix to identify unique local addresses is specified in Hinden, R. & Haberman, B., RFC 4193, "Unique Local IPv6 Unicast Address," Internet Society (2005). Prefix field 32 stores the address of the interface of the intended receiving endpoint. Interface ID field 34 stores the network interface address of the originating host.

Returning to FIG. 2, IPv6 packets associated with communications between application 22 and server 12 are thus modified by shim 24 to include cookie 28 as their source address, and are provided by shim 24 to kernel 26. Kernel 26 encapsulates these packets within a set of multiprotocol label switching (MPLS) labels according to mappings provided to the kernel by policy engine 18. In some cases, the encapsulation may be performed by a processor running on a network card rather than by the kernel.

Policy engine 18 is responsible for maintaining mappings between the original source/destination addresses of the A-to-B communications and the IPv6-format cookies, and between the IPv6-format cookies and a path, represented by MPLS source group and MPLS forward group labels for packets of a given flow. The MPLS labels are used within network 14 to forward packets between hops without the need to perform detailed routing lookups. In particular, packets are forwarded on flows (as specified by the labels), rather than on IP endpoint addresses. Accordingly, the policy engine 18 informs the nodes of the data conveyance infrastructure, e.g., applications 16 which provide the flow-based services as well as network entrance and egress points 20, of the MPLS labels and the policies to be applied to packets which bear such labels.

Figure 4:
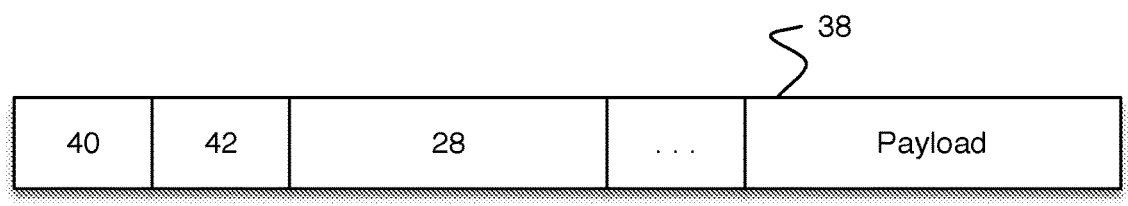
FIG. 4 illustrates an example of a packet having an identifier configured in accordance with embodiments of the preset invention.

FIG. 4 illustrates an example of an encapsulated packet 38 having cookie 28 and MPLS labels 40, 42. MPLS label 40 is an MPLS forwarding group label, while MPLS label 42 is an MPLS source group label. In one embodiment, kernel 26 ensures that the two MPLS labels are included on packets 38 by configuring extended Berkeley packet filters (EBPF) so that all packets originated by shim 24 with a specified source address cookie will be wrapped with specified MPLS labels. Network nodes, including access and egress points 20, may be informed by policy engine 18 of the labels used by such packets through conventional means, such as border gateway protocol (BGP) signaling or distributions conforming to a label distribution protocol (LDP).

To ensure that packets can be authenticated at the receiving endpoint, hash value field 36 stores an authentication value. This authentication value is a function, in one embodiment a cryptographically secure value of a hash, of selected parameters associated with a sending host, for example a unique identifier (UID) and/or group identifier (GID) of the process at the sending host that is initiating the transaction, a universally unique identifier (UUID) of the host, and the identifier 34 (e.g., a port ID) of the originating interface (which can be expected to be unique for each UID). Upon receipt of a packet, the receiving host can compute a hash of these parameters (obtained, for example, from the transmitting host and the policy engine 18 according to the IPv6 cookie received by B') and compare it to the hash value stored in the hash value field 36 of the received packet. If the computed value agrees with the value in field 96, this is an indication that the packet is authentic and has not been tampered with during transmission. If, however, the values do not agree, this is an indication that the packet is corrupted in some fashion, e.g., that it may have been tampered with along the execution path. In such instances, the receiving node can drop the packet and, optionally, request retransmission or otherwise inform the sending node of the problem.

In one embodiment, the authentication function is performed at the policy engine, wherein a receiving node forwards the received packet's IPv6 address along with the cryptographically secure value of a hash obtained from the subject packet. For the specified IPv6 address value, the policy engine computes the expected value of the hash operation and compares it with the value extracted from the subject packet. If the two values agree, this is an indication of the subject packet's authenticity and the receiving node can be advised of same. If the two values do not agree, this is an indication that either the packet has been corrupted in transmission or is not authentic (e.g., that it originates from a source attempting to spoof the receiving node), and the receiving node is advised of same. In such circumstances, the receiving node may drop the packet and, optionally, request retransmission.

Thus, any node with access to the policy engine can, at any time, validate a received packet's identifier relative to its forwarding information. That is, even though, within a given packet, the identifying information is kept separate from the forwarding information, any node with access to the policy engine can request verification that the packet is an authorized one, in the sense that the packet has originated from a known source and is directed to a known destination. Such requests can be made to the policy engine, which may be implemented in a distributed fashion over several nodes.

Through use of the cookies described above and the MPLS labels, the effective communication path is now A'-to-B'. This is a communication path defined by the network administrator, through application of the transformations specified by the policy engine. As a result, packets making up the communications can be observed at any point along the execution path and information regarding those communications stored. Indeed, the actual execution path is now known because the policy engine will have understood that communications were intended for the A-to-B path. Thus, logs may be maintained at any of the network ingress/egress points to provide information concerning the subject flow. So too can logs be maintained by any or all of the flow-based service applications. And, policies can be applied to packets on a flow-basis. In short, by decoupling host/interface identity information from reachability information in the networking communication protocol, the communications between A and B through the A-to-A' and B-to-B' transformations have been virtualized and visibility into those communications provided for.

Applying policies via the elements of the execution path between A' and B' can be done on the basis of the MPLS labels, or on the basis of the IPv6 cookie, or both. Using the IPv6 cookie as a policy enforcement mechanism is straightforward because it is formatted as an IPv6 address. Network elements such as routers, switches, and various applications (e.g., load balancers, etc.) are configured for extracting or observing such addresses and so can be adapted to make policy-based decisions (as specified by the policy engine) based on such information. For example, network admission policies may be enforced at ingress/egress points 20 on the basis of such information by maintaining admit/deny lists at these nodes and evaluating the IPv6 cookie information included in packets passing through the nodes against the lists. Indeed, such policies can be updated with near immediate effect as the admit/deny lists can be promulgated (appropriately encrypted or otherwise secured, if desired) by the policy engine and put into effect as of the next packet received by an ingress/egress node. This is especially useful in the case of a compromised client or service as the A-to-A' and B-to-B' transformations can be changed (thus changing the IPv6-address format cookies) and the ingress/egress nodes updated to drop any packets having the old, compromised cookie information and admit/pass only packets having the new cookie information. Similar actions may be taken at any other network node and/or service.

As should be evident from the above discussion, network 14 is an MPLS domain. An ingress/egress node 20 maintains connections to the sending/receiving hosts A and B, or more specifically the virtual hosts A' and B', and is configured to send or receive packets received from/destined to these hosts. The paths through network 14 defined by the MPLS labels are made available to the ingress/egress node by the policy engine 18 using any desired distribution means, for example, the routing information protocol (RIP), the open shortest path first (OSPF) protocol, the exterior border gateway protocol (EBGP), or a static route. For example, the policy engine may advertise the paths to be used within the MPLS domain using EBGP, and OSPF may be used as an interior gateway protocol (IGP) within the MPLS domain to provide connectivity information between nodes. Alternatively, label switched path (LSP) information may be distributed using the label distribution protocol (LDP) and resource reservation protocol (RSVP). Regardless of the means used, the policy engine ensures that nodes of network 14 are populated with path information for packets including the IPv6 cookies. That information may be maintained at the nodes using tables or other data structures.

When an ingress/egress node 20 receives a packet containing an IPv6 cookie, it assigns MPLS labels to the packet according to the mappings specified by the protocol engine. The MPLS labels so assigned will specify the next-hop information for the packet, according to the policy or policies to which packets of the respective flow are subject. Once the packet has traversed the network 14, e.g., hop-by-hop according to assigned MPLS labels at each point, it is received at an egress node 20 where the MPLS labels are removed and the packet is forwarded to the receiving host (or virtual host).

In addition to the ingress/egress controls and policy enforcement operations discussed above, the present invention also facilitates a straightforward method of converting unicast communications to anycast or multicast communications. For example, original unicast messages can be forwarded by a network node (including but not limited to an ingress/egress point) on an anycast or multicast basis according to the IPv6 cookie included in the packet. This forwarding operation can be viewed as a kind of policy enforcement and is facilitated because the IPv6 cookie is not used as a forwarding mechanism but rather only as an identification means. Hence, the cookie need not be tied to a specific destination, and instead can be used to represent a plurality of such destinations without the sending node having to specify anycast or multicast addresses.

At virtual hosts A' and B', the forwarding information and identity information are again merged into single components (e.g., IP addresses) for the respective client and server applications. Thus, from the standpoint of the original client and server, the present flow-based policy enforcement mechanism requires no modifications. Stated differently, the present flow-based policy enforcement mechanism is application agnostic.

The various apparatus discussed herein, including the policy engine, network nodes, ingress/egress points, and hosts, may each be implemented on processor-based platforms in which stored processor-executable instructions are executed so as to cause the respective apparatus to perform the functions described above. These instructions are typically stored on one or more processor-readable storage mediums, such as memories, disk drives, flash drives, or other persistent or erasable/writable media, accessible to processing elements of the processor-based platform. The algorithms and processes so stored and presented herein are not inherently related to any particular computer system, processor or other apparatus. Moreover, any of the present methods can be implemented in hard-wired circuitry, by appropriate programming of a computer processor or processors, or any combination of hardware and software.

Processor-based systems suitable for use in accordance with the present invention will typically include, in addition to the processor and storage media, communication means, such as one or more busses, communicatively coupling the processor and storage media (and other elements of the processor-based platform), main memory, such as a random access memory (RAM) or other dynamic storage device, for storing information (such as temporary variables or other intermediate information during execution of instructions to be executed by processor) and instructions to be executed by the processor, and network interfaces with modems appropriate to the wired and or wireless computer networks of which the processor-based platforms are a part to permit data communications with like platforms. Where interactions with users are required or expected, such platforms may also include displays and user input means, such as keyboards and cursor control devices.

Thus, systems and methods for flow virtualization and visibility, and in particular, to such methods and systems as employ means for decoupling application and/or host/interface identity information from reachability information in networking protocols have been described.

What is claimed is:

1. A method of providing for flow-based policies within a network, the method comprising:

for each of a plurality of packets addressed according to a first network layer communication protocol for transmission between a client application and a server application, appending, to the packet, a source address of the packet formatted according to a second network layer communication protocol and a forwarding label derived from at least a portion of the source address, wherein the source address includes packet-source authentication information that is used to determine whether or not said packet was corrupted or tampered with during the transmission of the packet between the client application and the server application, wherein the packet-source authentication information is a first hash of a unique identifier (UID) and/or a group identifier (GID) of a process at an originating host that is initiating a transaction, a universally unique identifier (UUID) of the originating host, and a network interface address of the originating host, wherein the source address further includes a prefix field that stores an address of an interface of an intended receiving endpoint, and wherein the source address further includes an interface identity field that stores the network interface address of the originating host; and conveying said packets within a network according to the forwarding labels, wherein said network comprises a plurality of communicably coupled nodes between the client application and the server application, and at one or more of said plurality of nodes of the network, applying one or more prescribed policies to said packets, said policies being prescribed on a basis of information included within the respective source addresses.

2. The method of claim 1, wherein the source address has a format of an Internet protocol version 6 (IPv6) address.

3. The method of claim 2, wherein the forwarding label is a multiprotocol label switching (MPLS) label.

4. The method of claim 3, wherein, for each of the packets, the source address is received from a policy engine remote from a computer-based platform at which the source address is appended to the packet.

5. The method of claim 4, further comprising, for each of the packets, maintaining, by the policy engine, an association between the forwarding label and the source address.

6. The method of claim 1, further comprising, for at least one of the packets and at any of the nodes of the network, extracting identification information and the packet-source authentication information of the packet, forwarding the identification information and the packet-source authentication information of the packet to a policy engine, and receiving, from the policy engine, an indication concerning an authenticity of the packet.

7. The method of claim 6, further comprising generating, by the policy engine, the indication concerning the authenticity of the packet according to whether or not a second hash of the identification information corresponds to the packet-source authentication information.

* * * * *